United States Patent
Li et al.

(10) Patent No.: US 11,284,416 B2
(45) Date of Patent: Mar. 22, 2022

(54) ADAPTIVE ULTRA-RELIABLE LOW-LATENCY COMMUNICATIONS (URLLC) SEMI-PERSISTENT SCHEDULING

(71) Applicant: QUALCOMM Incorporated, San Diego, CA (US)

(72) Inventors: Chong Li, Weehawken, NJ (US); Junyi Li, Chester, NJ (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2 days.

(21) Appl. No.: 15/388,512

(22) Filed: Dec. 22, 2016

(65) Prior Publication Data
US 2018/0184444 A1 Jun. 28, 2018

(51) Int. Cl.
*H04W 72/12* (2009.01)
*H04L 1/00* (2006.01)
(Continued)

(52) U.S. Cl.
CPC ....... *H04W 72/1252* (2013.01); *H04L 1/0003* (2013.01); *H04L 5/0044* (2013.01);
(Continued)

(58) Field of Classification Search
None
See application file for complete search history.

(56) References Cited

U.S. PATENT DOCUMENTS

2002/0159396 A1* 10/2002 Carlson .................. H04L 47/32
370/252
2003/0137939 A1* 7/2003 Dunning .................. H04L 1/08
370/235
(Continued)

FOREIGN PATENT DOCUMENTS

EP 3035769 A1 6/2016

OTHER PUBLICATIONS

Afrin N., et al., "Performance Evaluation of an Adaptive Semi-Persistent LTE Packet Scheduler for M2M Communications", IEEE, School of Electrical Engineering and Computer Science the University of Newcastle, 2014, pp. 1-7.
(Continued)

*Primary Examiner* — Christopher T Wyllie
(74) *Attorney, Agent, or Firm* — Holland & Hart LLP

(57) ABSTRACT

Methods, systems, and devices for wireless communication for adaptive ultra-reliable low-latency communications (URLLC) semi-persistent scheduling (SPS) are described. One method includes determining a data packet payload size for a transmission using SPS resources in a transmission time interval (TTI). The method also includes sending a release signal to release a portion of the SPS resources in the TTI based on the size and transmitting the data packet during the TTI using unreleased SPS resources. Another method includes identifying that a packet profile of packets transmitted on SPS resources varies by more than a packet profile threshold and sending, based at least in part on the identifying, a request-to-update (RTU) signal to update the SPS
(Continued)

resources. The method also include receiving a confirmation of receipt of the RTU signal and updating a resource allocation or a resource attribute based at least in part on the packet profile and confirmation of receipt.

22 Claims, 14 Drawing Sheets

(51) Int. Cl.
*H04L 5/00* (2006.01)
*H04W 72/14* (2009.01)
*H04W 24/08* (2009.01)
*H04W 72/04* (2009.01)
*H04L 1/18* (2006.01)
*H04W 72/10* (2009.01)

(52) U.S. Cl.
CPC .......... *H04L 5/0053* (2013.01); *H04L 5/0055* (2013.01); *H04L 5/0094* (2013.01); *H04W 24/08* (2013.01); *H04W 72/0406* (2013.01); *H04W 72/14* (2013.01); *H04L 1/18* (2013.01); *H04W 72/10* (2013.01)

(56) References Cited

U.S. PATENT DOCUMENTS

| | | | | |
|---|---|---|---|---|
| 2004/0085945 A1* | 5/2004 | Takabatake | ........... | H04W 12/06 370/338 |
| 2004/0208125 A1* | 10/2004 | Damon | ................... | H04L 47/20 370/235 |
| 2009/0207794 A1* | 8/2009 | Meylan | ................ | H04W 76/28 370/329 |
| 2011/0235602 A1* | 9/2011 | Ji | .......................... | H04L 5/0058 370/329 |
| 2014/0177527 A1* | 6/2014 | Lee | ......................... | H04L 69/24 370/328 |
| 2015/0043458 A1* | 2/2015 | Seo | ....................... | H04L 1/1861 370/329 |
| 2015/0282148 A1 | 10/2015 | Le | | |
| 2016/0087775 A1* | 3/2016 | Hedayat | .................... | H04L 1/12 370/329 |
| 2016/0270093 A1 | 9/2016 | Wang et al. | | |
| 2018/0049073 A1* | 2/2018 | Dinan | ................ | H04W 72/0413 |

OTHER PUBLICATIONS

Salihu B.A., et al., "New Remapping Strategy for PDCCH Scheduling for LTE-Advanced Systems", Journal of Communications, vol. 9, No. 7, Jul. 2014, pp. 563-571.
Ericsson, "Acknowledgements for SPS Commands," 3GPP TSG-RAN WG2 Meeting #93bis, Tdoc R2-162781, Dubrovnik, Croatia, Apr. 11-15, 2016, 3 pgs., XP051082549, 3rd Generation Partnership Project.
Huawei et al., "SPS Enhancement for V2X on Uu Interface," 3GPP TSG RAN WG1 Meeting #86bis, R1-1608596, Lisbon, Portugal, Oct. 10-14, 2016, 4 pgs., XP051148655, 3rd Generation Partnership Project.
ISA/EP, International Search Report and Written Opinion of the International Searching Authority, Int'l Application No. PCT/US2017/063297, dated Feb. 7, 2018, European Patent Office, Rijswijk, NL, 18 pgs.
Nokia et al., "Enhanced Semi-Persistent Scheduling for 5G URLLC," 3GPP TSG-RAN WG1 Meeting #87, R1-1612251, Reno, USA, Nov. 14-18, 2016, 8 pgs., XP051190365, 3rd Generation Partnership Project.
Samsung, "UL URLLC Transmissions," 3GPP TSG RAN WG2 Meeting #96, R2-168826, Reno, USA, Nov. 14-18, 2016, 3 pgs., XP051178394, 3rd Generation Partnership Project.
To V.S.Y., et al., "Quality of Service Framework in MANETs using Differentiated Services," Vehicular Technology Conference, 2003, VTC 2003—FALL, 2003 IEEE 58th Orlando, FL, USA, Piscataway, NJ, USA,IEEE, US, pp. 3463-3467, XP010701233, DOI: 10.1109/VETECF.2003.1286358, ISBN: 978-0-7803-7954-1.
Intel Corporation: "On eMBB and URLLC Multiplexing", 3GPP Draft, R1-1609546, Intel—URLLC_EMBB_MUX, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051149585, 5 pages, Retrieved from the Internet: URL: http://www.3gpp.org/ftp/Meetings_3GPP_SYNC/RAN1/Docs/ [retrieved on Oct. 9, 2016].
Taiwan Search Report—TW106141108—TIPO—dated Jan. 12, 2021 (164784TW).

* cited by examiner

ADAPTIVE ULTRA-RELIABLE LOW-LATENCY COMMUNICATIONS (URLLC) SEMI-PERSISTENT SCHEDULING

BACKGROUND

The following relates generally to wireless communication at a wireless node, and more specifically to adaptive ultra-reliable low-latency communications (URLLC) semi-persistent scheduling (SPS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Multiple types of traffic may be communicated in a wireless communication system. In some cases, different performance metrics of the different types of traffic may cause some types of traffic to have a higher priority than others. One example of a type of traffic in a wireless communication system may include URLLC, also sometimes referred to as mission-critical communications, which may specify that packets are communicated with low latency and with high-reliability. URLLC or mission-critical communications may be examples of communications having a high priority, or a priority that is above a threshold. Low priority communications include communications that have a priority that is below a threshold. Examples of communications having a priority level that is less than that of URLLC or mission-critical communications include enhanced mobile broadband (eMBB) communications. A wireless communication system may designate resources to be used for various types of communications, such as high priority or low priority traffic.

SUMMARY

The described techniques relate to improved methods, systems, devices, or apparatuses that support adaptive ultra-reliable low-latency communications (URLLC) semi-persistent scheduling (SPS). Generally, the described techniques provide the ability to adapt pre-defined communication resources and other attributes that are semi-persistently scheduled. A set of semi-persistent communication resources may be reserved for use by priority traffic. If not all of the available SPS resources are used for priority traffic, the SPS resources which are not used may be released for use by other types of traffic. The SPS resources may be adapted based on a per-transmission time interval (TTI) or semi-static adaptation. In examples where the SPS resources are adapted based on TTIs, a payload size of a priority data packet may be determined and any unused SPS resources may be released. In examples employing semi-static adaptation techniques, slowly varying URLLC packet profiles may be used to update allocated resources. These techniques may be used cooperatively.

A method of wireless communication at a wireless node is described. The method may include determining a data packet payload size for a transmission using SPS resources budgeted for the transmission of the data packet in a TTI, sending a release signal to release a portion of the SPS resources in the TTI based on the data packet payload size, and transmitting the data packet during the TTI using unreleased SPS resources.

An apparatus for wireless communication at a wireless node is described. The apparatus may include means for determining a data packet payload size for a transmission using SPS resources budgeted for the transmission of the data packet in a TTI, means for sending a release signal to release a portion of the SPS resources in the TTI based on the data packet payload size, and means for transmitting the data packet during the TTI using unreleased SPS resources.

Another apparatus for wireless communication at a wireless node is described. The apparatus may include a processor, memory in electronic communication with the processor, and instructions stored in the memory. The instructions may be operable to cause the processor to determine a data packet payload size for a transmission using SPS resources budgeted for the transmission of the data packet in a TTI, send a release signal to release a portion of the SPS resources in the TTI based on the data packet payload size, and transmit the data packet during the TTI using unreleased SPS resources.

A non-transitory computer readable medium for wireless communication at a wireless node is described. The non-transitory computer-readable medium may include instructions operable to cause a processor to determine a data packet payload size for a transmission using SPS resources budgeted for the transmission of the data packet in a TTI, send a release signal to release a portion of the SPS resources in the TTI based on the data packet payload size, and transmit the data packet during the TTI using unreleased SPS resources.

In some examples of the method, apparatus, and non-transitory computer-readable medium described above, transmitting the data packet using unreleased SPS resources comprises: transmitting the data packet in a first portion of the SPS resources, the first portion of the SPS resources being the unreleased SPS resources and being in advance of released SPS resources.

In some examples of the method, apparatus, and non-transitory computer-readable medium described above, determining the data packet payload size further comprises: determining a number of basic payload units to be used for the transmission of the data packet.

In some examples of the method, apparatus, and non-transitory computer-readable medium described above, the release signal to release the portion of the SPS resources may be further based on an amount of budgeted units that may be available less the number of units.

Some examples of the method, apparatus, and non-transitory computer-readable medium described above may further include processes, features, means, or instructions for receiving one or more ACKs in response to the transmission, the one or more ACKs corresponding to each of a basic payload unit included in the transmission.

Some examples of the method, apparatus, and non-transitory computer-readable medium described above may further include processes, features, means, or instructions for receiving one or more additional ACKs corresponding to the released SPS resources. Some examples of the method, apparatus, and non-transitory computer-readable medium described above may further include processes, features, means, or instructions for ignoring the one or more additional ACKs.

Some examples of the method, apparatus, and non-transitory computer-readable medium described above may further include processes, features, means, or instructions for receiving a single ACKs in response to the transmission of the data packet.

In some examples of the method, apparatus, and non-transitory computer-readable medium described above, the SPS resources may be reserved for priority traffic.

Some examples of the method, apparatus, and non-transitory computer-readable medium described above may further include processes, features, means, or instructions for transmitting the release signal until new data for transmission may be detected, wherein the release signal comprises a single bit.

A method of wireless communication at a wireless node is described. The method may include receiving a release signal to release a portion of SPS resources in a TTI based on a data packet payload size and receiving the data packet during the TTI using unreleased SPS resources.

An apparatus for wireless communication at a wireless node is described. The apparatus may include means for receiving a release signal to release a portion of SPS resources in a TTI based on a data packet payload size and means for receiving the data packet during the TTI using unreleased SPS resources.

Another apparatus for wireless communication at a wireless node is described. The apparatus may include a processor, memory in electronic communication with the processor, and instructions stored in the memory. The instructions may be operable to cause the processor to receive a release signal to release a portion of SPS resources in a TTI based on a data packet payload size and receive the data packet during the TTI using unreleased SPS resources.

A non-transitory computer readable medium for wireless communication at a wireless node is described. The non-transitory computer-readable medium may include instructions operable to cause a processor to receive a release signal to release a portion of SPS resources in a TTI based on a data packet payload size and receive the data packet during the TTI using unreleased SPS resources.

Some examples of the method, apparatus, and non-transitory computer-readable medium described above may further include processes, features, means, or instructions for decoding only the unreleased resources in the TTI based on the release signal.

Some examples of the method, apparatus, and non-transitory computer-readable medium described above may further include processes, features, means, or instructions for sending a single acknowledgement (ACK) in response to receiving the data packet during the TTI.

Some examples of the method, apparatus, and non-transitory computer-readable medium described above may further include processes, features, means, or instructions for decoding all of the SPS resources in the TTI. Some examples of the method, apparatus, and non-transitory computer-readable medium described above may further include processes, features, means, or instructions for sending a same number of ACK and negative-acknowledgement (NACK) as there may be SPS resources in the TTI in response to receiving the data packet during the TTI.

A method of wireless communication at a wireless node is described. The method may include identifying that a packet profile of packets transmitted on SPS resources varies by more than a packet profile threshold, sending, based at least in part on the identifying, a request-to-update (RTU) signal to update the SPS resources, receiving a confirmation of receipt of the RTU signal, and updating at least one of a resource allocation or a resource attribute based at least in part on the packet profile and receipt of the confirmation.

An apparatus for wireless communication at a wireless node is described. The apparatus may include means for identifying that a packet profile of packets transmitted on SPS resources varies by more than a packet profile threshold, means for sending, based at least in part on the identifying, a RTU signal to update the SPS resources, means for receiving a confirmation of receipt of the RTU signal, and means for updating at least one of a resource allocation or a resource attribute based at least in part on the packet profile and receipt of the confirmation.

Another apparatus for wireless communication at a wireless node is described. The apparatus may include a processor, memory in electronic communication with the processor, and instructions stored in the memory. The instructions may be operable to cause the processor to identify that a packet profile of packets transmitted on SPS resources varies by more than a packet profile threshold, send, based at least in part on the identifying, a RTU signal to update the SPS resources, receive a confirmation of receipt of the RTU signal, and update at least one of a resource allocation or a resource attribute based at least in part on the packet profile and receipt of the confirmation.

A non-transitory computer readable medium for wireless communication at a wireless node is described. The non-transitory computer-readable medium may include instructions operable to cause a processor to identify that a packet profile of packets transmitted on SPS resources varies by more than a packet profile threshold, send, based at least in part on the identifying, a RTU signal to update the SPS resources, receive a confirmation of receipt of the RTU signal, and update at least one of a resource allocation or a resource attribute based at least in part on the packet profile and receipt of the confirmation.

Some examples of the method, apparatus, and non-transitory computer-readable medium described above may further include processes, features, means, or instructions for periodically resending the RTU signal until the confirmation of the RTU signal may be received.

Some examples of the method, apparatus, and non-transitory computer-readable medium described above may further include processes, features, means, or instructions for encoding the RTU signal such that the RTU signal may be only decoded if the entire encrypted RTU signal may be received.

Some examples of the method, apparatus, and non-transitory computer-readable medium described above may further include processes, features, means, or instructions for defining a timer, wherein sending the RTU signal may be based on an expiration of the timer.

In some examples of the method, apparatus, and non-transitory computer-readable medium described above, the resource attribute further comprises at least one of a modulation and coding scheme (MCS) and a scheduling grant.

In some examples of the method, apparatus, and non-transitory computer-readable medium described above, the packet profile varies in time by less than a time threshold.

Some examples of the method, apparatus, and non-transitory computer-readable medium described above may further include processes, features, means, or instructions for determining to send the RTU signal based on at least one of a buffer status of the UE and a channel condition.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
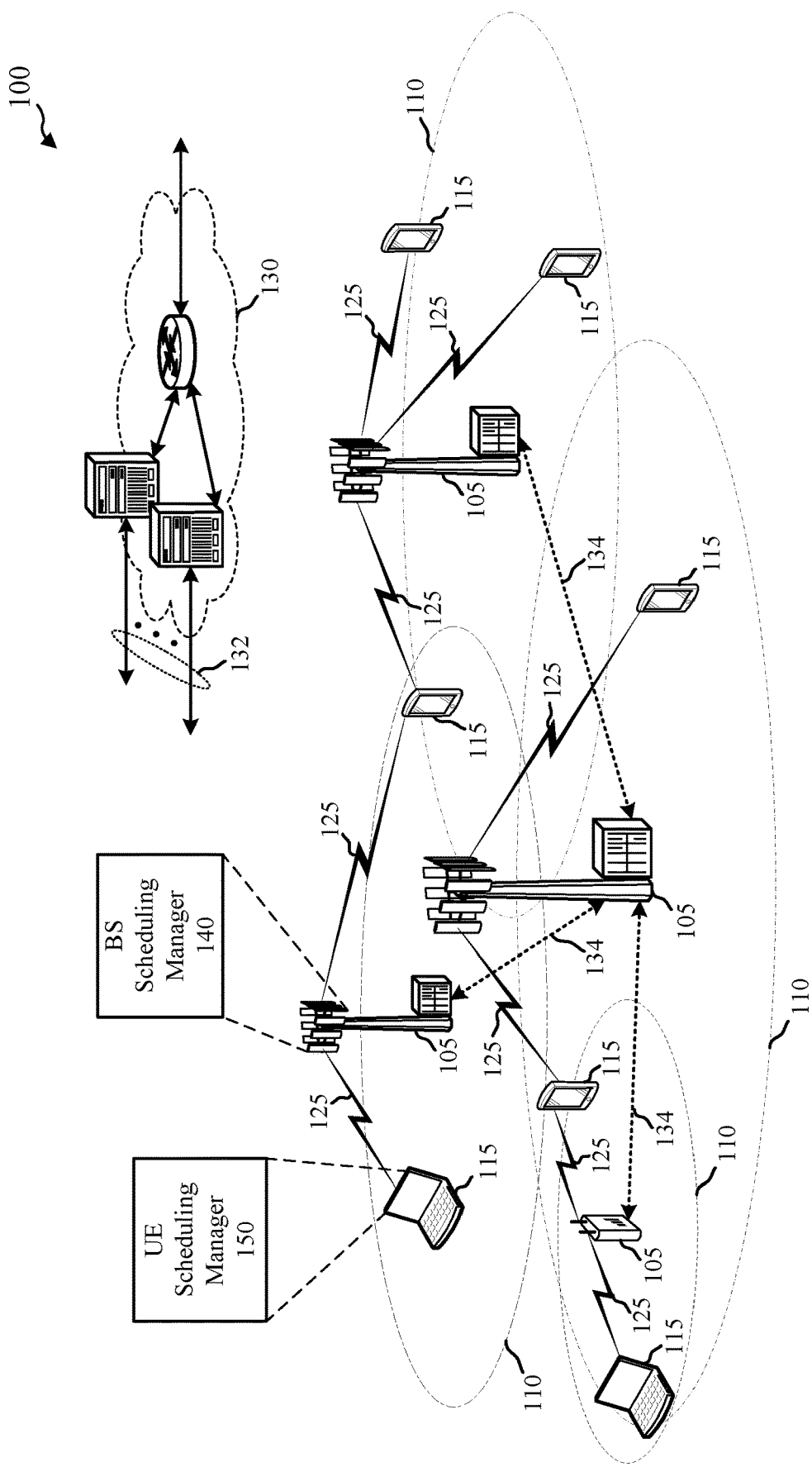
FIG. 1 illustrates an example of a system for wireless communication at a wireless node that supports adaptive ultra-reliable low-latency communications (URLLC) semi-persistent scheduling in accordance with aspects of the present disclosure.

Wireless communication systems may communicate priority traffic using ultra-reliability low-latency communications (URLLC) semi-persistent scheduling (SPS). SPS resources may be assigned using radio resource control (RRC) signaling to user equipments (UEs) which support URLLC (referred to herein as URLLC UEs or UEs). RRC signaling may indicate a period of transmission time intervals (TTIs) on which the SPS resources and other attributes (e.g., modulation and coding scheme (MCS)) are explicitly assigned to URLLC UEs. A base station may use URLLC SPS resources to transmit downlink priority traffic. A UE may use URLLC SPS resources to transmit uplink priority traffic.

In some situations, SPS resources may be assigned for each TTI. However, in certain instances, there may not be URLLC traffic for a given TTI. In these cases, the SPS resources may be released because they are not being used for priority traffic. For example, if a base station determines there is no URLLC downlink traffic, the base station may transmit a releasing signal to a UE. In response to receiving the releasing signal, the UE may clear the grant on the TTI. Once cleared of the grant, the base station may release the SPS resources. These released resources may be used for other traffic, such as for enhanced mobile broadband (eMBB) traffic. If a UE does not receive a releasing signal, it may continue to decode SPS resources. In another example where the UE determines there is no URLLC uplink traffic, the UE may notify the base station to release the SPS resources. The base station that successfully receives this signal may schedule other traffic (such as eMBB traffic) on the next uplink TTI.

In URLLC SRS, the resource allocation and other attributes (e.g., modulation and coding schem (MCS)), which are configured by RRC, are semi-static. In other words, there is no link adaptation or dynamic resource scheduling. In practice, an URLLC UE with varying packet attributes (size, deadline requirements, etc.) and instantaneous channel conditions may need more or less resources than are allocated in the semi-static SPS resources. While techniques for releasing an entire SPS resource block may apply well to situations where there is no priority traffic for a TTI, other solutions may be used when there is priority traffic, but where the priority traffic requires less than the budgeted SPS resources to transmit.

Techniques are described herein to provide adaptive SPS resources so that at least some SPS resources that would not be used to transmit the priority traffic may be released for other purposes. The techniques may apply over different time scales—such as over a faster time scale and over a slower time scale. For the faster time scale, SPS resources may be released on a per-TTI-basis. That is, the SPS resources needed for a given TTI may be evaluated and any unneeded SPS resources may be released. For the slower time scale, the characteristics of URLLC packet profiles, which vary slowly over time, may be used to update the budgeted SPS resources. These techniques may be used in conjunction to more closely adapt the budgeted SPS resources to the actual needs of the URLLC traffic.

Therefore, techniques described herein provide link adaptation and dynamic resource allocation mechanisms for URLLC SRS. These techniques can be used to reduce wasting unused radio resources. In this manner, radio resources are preserved, power savings are achieved, and other traffic may be communicated more quickly, among other advantages.

Aspects of the disclosure are initially described in the context of a wireless communications system. Swim diagrams are provided for TTI-based adaption and semi-static adaptation of the adaptive URLLC SPS techniques. Aspects of the disclosure are further illustrated by and described with reference to apparatus diagrams, system diagrams, and flowcharts that relate to adaptive URLLC semi-persistent scheduling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Different signaling may be used in the wireless communication system 100 to perform adaptive URLLC SPS as described herein. Releasing signals may be used to release unused SPS resources when the URLLC traffic requires less than the budgeted SPS resources. Request-to-update (RTU) signals may be used to update assignments of SPS resources and radio attributes based on URLLC packet profiles.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of base stations 105 may include a BS adaptive SPS manager 140, which may perform techniques as described herein for adaptive URLLC SPS. For example, the BS adaptive SPS manager 140 may determine a data packet payload size for a transmission using SPS resources budgeted for the transmission of the data packet in a TTI. The BS adaptive SPS manager 140 may cause a transceiver to send a release signal to release a portion of the SPS resources in the TTI based on the data packet payload size and then transmit the data packet during the TTI using unreleased SPS resources. The BS adaptive SPS manager 140 may be capable of receive a release signal to release a portion of SPS resources in a TTI based on a data packet payload size. The BS adaptive SPS manager 140 may decode only the received data packet during the TTI using unreleased SPS resources.

In another example, the BS adaptive SPS manager 140 may identifying that a packet profile of packets transmitted on SPS resources varies by more than a packet profile threshold. The BS adaptive SPS manager 140 may cause a transceiver to send, based at least in part on the identifying, a request-to-update (RTU) signal to update the SPS resources. Once a confirmation of receipt of the RTU signal is received, the BS adaptive SPS manager 140 may update at least one of a resource allocation or a resource attribute based at least in part on the packet profile and receipt of the confirmation.

UEs 115 may include a UE adaptive SPS manager 150, which may perform techniques as described herein for adaptive URLLC SPS. For example, the UE adaptive SPS manager 150 may determine a data packet payload size for a transmission using SPS resources budgeted for the transmission of the data packet in a TTI. The UE adaptive SPS manager 150 may cause a transceiver to send a release signal to release a portion of the SPS resources in the TTI based on the data packet payload size and then transmit the data packet during the TTI using unreleased SPS resources. The UE adaptive SPS manager 150 may be capable of receive a release signal to release a portion of SPS resources in a TTI based on a data packet payload size. The UE adaptive SPS manager 150 may decode only the received data packet during the TTI using unreleased SPS resources.

In another example, the UE adaptive SPS manager 150 may identifying that a packet profile of packets transmitted on SPS resources varies by more than a packet profile threshold. The UE adaptive SPS manager 150 may cause a transceiver to send, based at least in part on the identifying, a request-to-update (RTU) signal to update the SPS resources. Once a confirmation of receipt of the RTU signal is received, the UE adaptive SPS manager 150 may update at least one of a resource allocation or a resource attribute based at least in part on the packet profile and receipt of the confirmation.

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 115) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105-*c*, base station 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
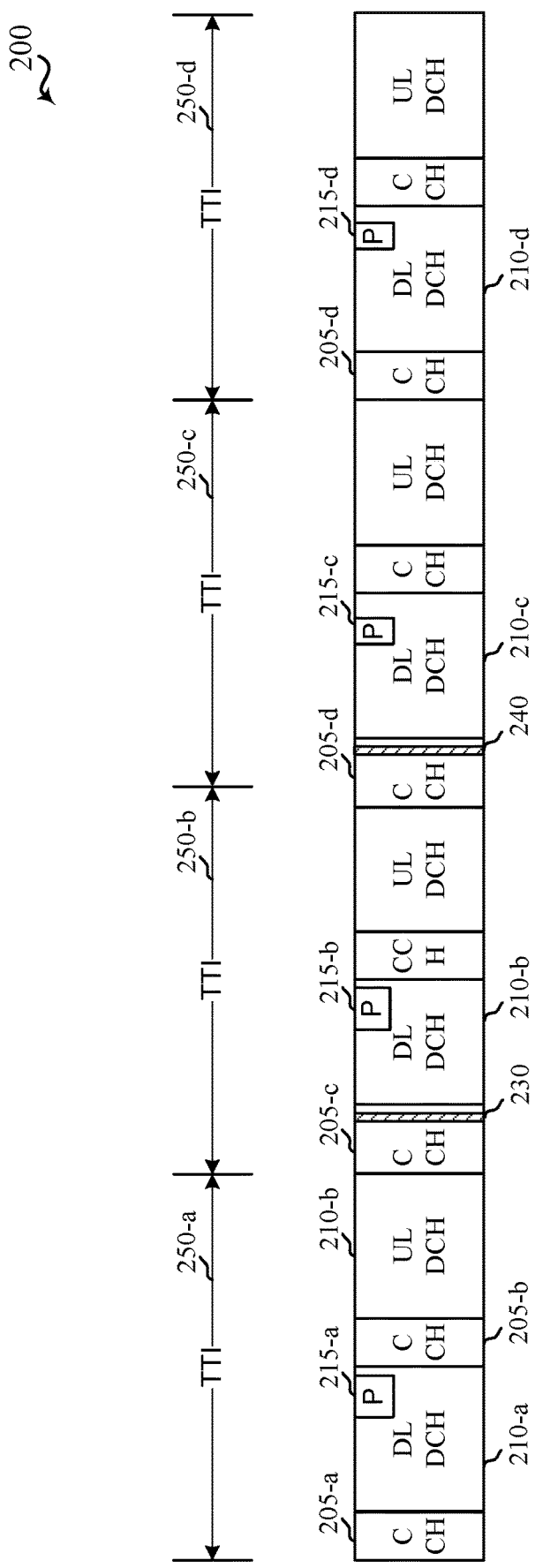
FIG. 2 illustrates an example of resource structures that supports adaptive URLLC semi-persistent scheduling in accordance with aspects of the present disclosure.

FIG. 2 illustrates an example of resource structures 200 that supports adaptive URLLC semi-persistent scheduling in accordance with aspects of the present disclosure. Depicted are multiple TTIs 250-a, 250-b, 250-c, and 250-d. Each TTI 250 may include a control channel (CCH) 205 and a data channel (DCH) 210. Examples of the control channel 205 include a physical downlink control channel (PDCCH), a physical uplink control channel (PUCCH), and the like. Examples of the data channel 210 include a physical downlink shared channel (PDSCH), physical uplink shared channel (PUSCH), and the like. In this example, a base station, such as a base station 105, may coordinate with a UE, such as a UE 115, to establish a block 215 of SPS resources in multiple TTIs 250. As depicted, blocks 215-a, 215-b, 215-c, and 215-d respectively within data channels 210-a, 210-b, 210-c, and 210-d are allocated for transmission of priority traffic from base station 105 to UE 115. That is, blocks 215 are allocated SPS resources, which may be a number, N, of basic payload units ($\beta$). A basic payload unit may be a small size of radio resources.

Even though a block 215 of SPS resources may be established, there may be TTIs 250 in which the base station 105 has priority traffic to send which takes less SPS resources than is allocated. For efficient utilization of data channel 210, base station 105 may send a release signal to release at least some of the SPS resources in the current TTI or a next TTI. The released SPS resources may be used to transport other traffic, such as non-priority traffic. For example, during TTI 250-b, base station 105 determines that a data packet to send in the next TTI has a payload size smaller than the allocated budget of SPS resources. Base station 105 may transmit a release signal 230 in the control channel 205-c to UE 115 to release a portion of the SPS resources 215-b that will not be used for the data packet. Base station 105 may release the identified portion of the SPS resources 215-b, which may be a number of basic payload units.

Base station 105 may be monitoring URLLC packet profiles (e.g., size, deadline requirements, etc.) over time and may determine that the packet profiles are slowly varying and have been larger or smaller than the SPS resources 215 budgeted. In this case, base station 105 may send a RTU signal 240 to UE 115 to obtain conformation to update the resource allocation. Base station 105 may send the RTU signal 240 in a control channel, such as C CH 205-d. If UE 115 receives the RTU and provides base station 105 a confirmation of receipt, base station 105 may update the allocation of resources. Thus, the next SPS resources may be a different size based on the update. For example, SPS resources 215-c and 215-d are shown smaller (less SPS resources) than SPS resources 215-a and 215-b, which came before the RTU 240.

FIG. 2 merely shows a single example of resource structures 200 and is described from the perspective of base station 105. However, other allocations and set-ups of resource structures 200 may be used. Furthermore, UE 115 may also perform the techniques described herein with respect to base station 105.

Figure 3:
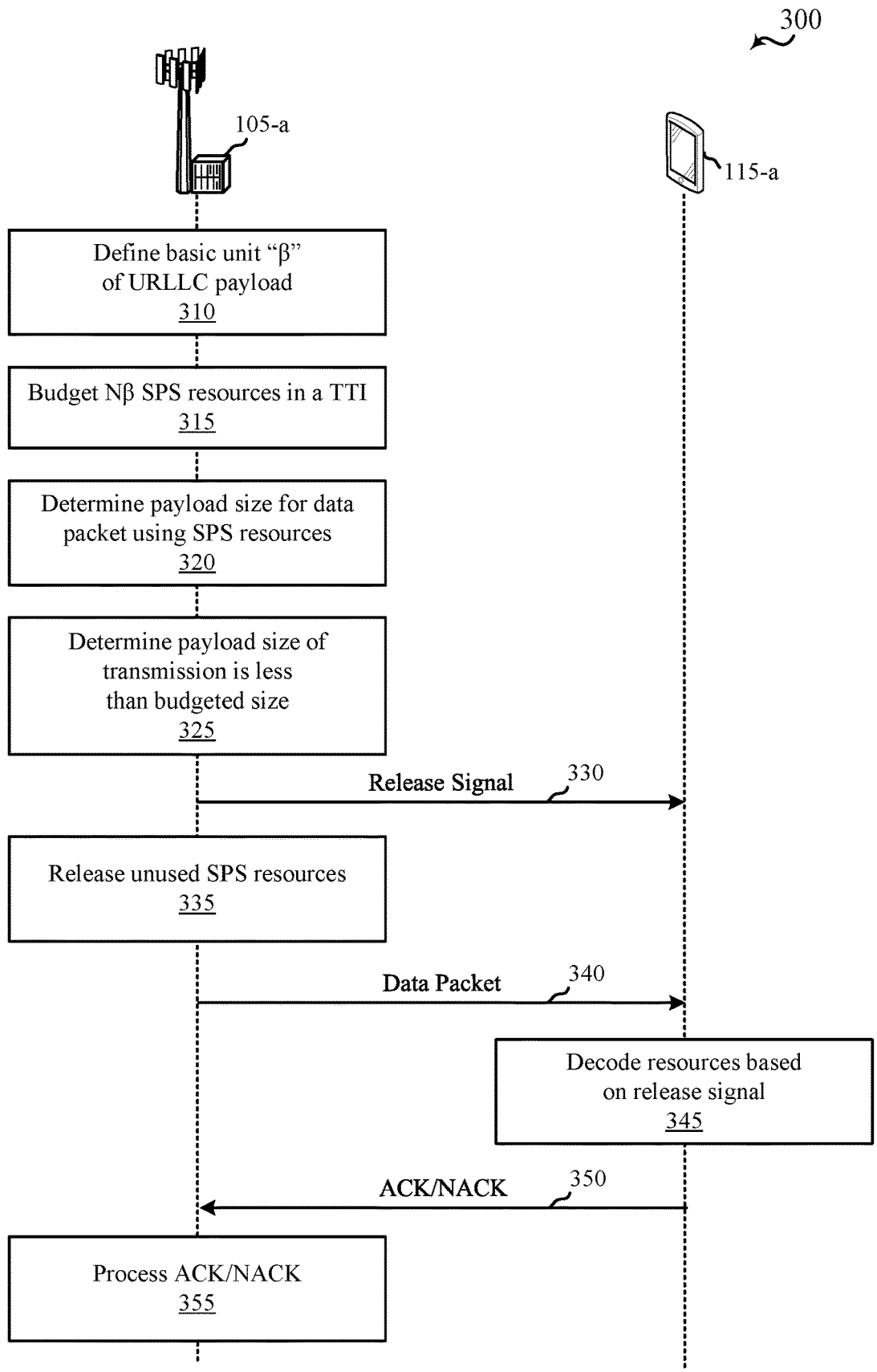
FIGS. 3 through 4 illustrate examples of communications between a base station and a user equipment (UE) that supports transmission time interval (TTI)-based adaptive URLLC semi-persistent scheduling in accordance with aspects of the present disclosure.

FIG. 3 illustrates an example of communications 300 between a base station 105-a and a UE 115-a that supports TTI-based adaptive URLLC semi-persistent scheduling in accordance with aspects of the present disclosure. Base station 105-a may be an example of aspects of a base station 105 as described with reference to FIG. 1. UE 115-a may be an example of aspects of a UE 115 as described with reference to FIG. 1. In the example of FIG. 3, base station 105-a sends a release signal to UE 115-a.

At 310, base station 105-a may define a basic unit "β" of URLLC payload. At 315, base station 105-a may coordinate with UE 115-a to establish a block of SPS resources in multiple TTIs. An SPS resource allocation may be of a maximum of Nβ units of resources, where N is an positive integer. In an example, radio resource control (RRC) signaling may be exchanged to set up a block of SPS resources in multiple TTIs that may be used by the UE 115-a, the base station 105-a, or both. For example, the base station 105-a may establish a block of SPS resources in a downlink data channel for communicating priority traffic to the UE 115-a. The block of SPS resources may include Nβ units of resources.

At 320, base station 105-a determines a payload size for a data packet that is for priority transmission over SPS resources. If the payload size is less than Nβ units of resources, base station 105-a may release the unused SRS resources. That is, in each TTI, if the traffic only requires kβ units, where k is a positive integer less than N, base station 105-a releases (N−k)β resources to be used for other purposes (e.g., by eMBB). Base station 105-a sends release signal 330 to UE 115-a to release the unused resources. Base station 105-a may send release signal 330 in a PDCCH in the TTI. In the examples described herein, the SPS resources are discussed as being in sequential order (e.g., 1, 2, . . . , k, . . . N). However, in some examples, the SPS resources are not in sequential order. In such examples, release signal 330 may indicate which resources are to be released.

At 335, base station 105-a may release the unused SPS resources. At 340, base station 105-a may transmit the data packet 340 to UE 115-a. UE 115-a may decode only those resources identified as not being released based on release signal 330 at 345. For example, UE 115-a may only decode kβ resources. In some examples, if UE 115-a did not receive the release signal 330, UE 115-a decodes all of the SPS resources.

UE 155-a sends an ACK/NACK 350 in response to decoding the resources. UE 115-a may send a single ACK/NACK 350 or k ACK/NACKs 350. In examples where UE 115-a blindly decodes all Nβ resources, UE 115-a may send N corresponding ACK/NACKs. At 355, base station 105-a processes the received ACK/NACKs. Base station 105-a may ignore any NACKs received for the released SPS resources. Base station 105-a may retransmit any small packets that have been NACKed.

In examples where data packets may have varying sizes, a single data packet may be allocated to kβ resources. If successfully receiving release signal 330, UE 115-a only decodes kβ resources. Otherwise, UE 115-a does a blind decoding for N cases, and response with a single ACK or NACK 350. The ACK can be multi-levels indicating 1 to N.

Some examples may rearrange the order of some of the steps described here. For example, data packet 340 may be transmitted before the unused SPS resources are released. In other examples, other steps may be included. For example, UE 115-a may send another ACK/NACK to base station 105-a in response to release signal 330. In some examples, base station 105-a may only release the SPS resources when UE 115-a has confirmed receipt of the release signal 330 via an ACK.

Figure 4:
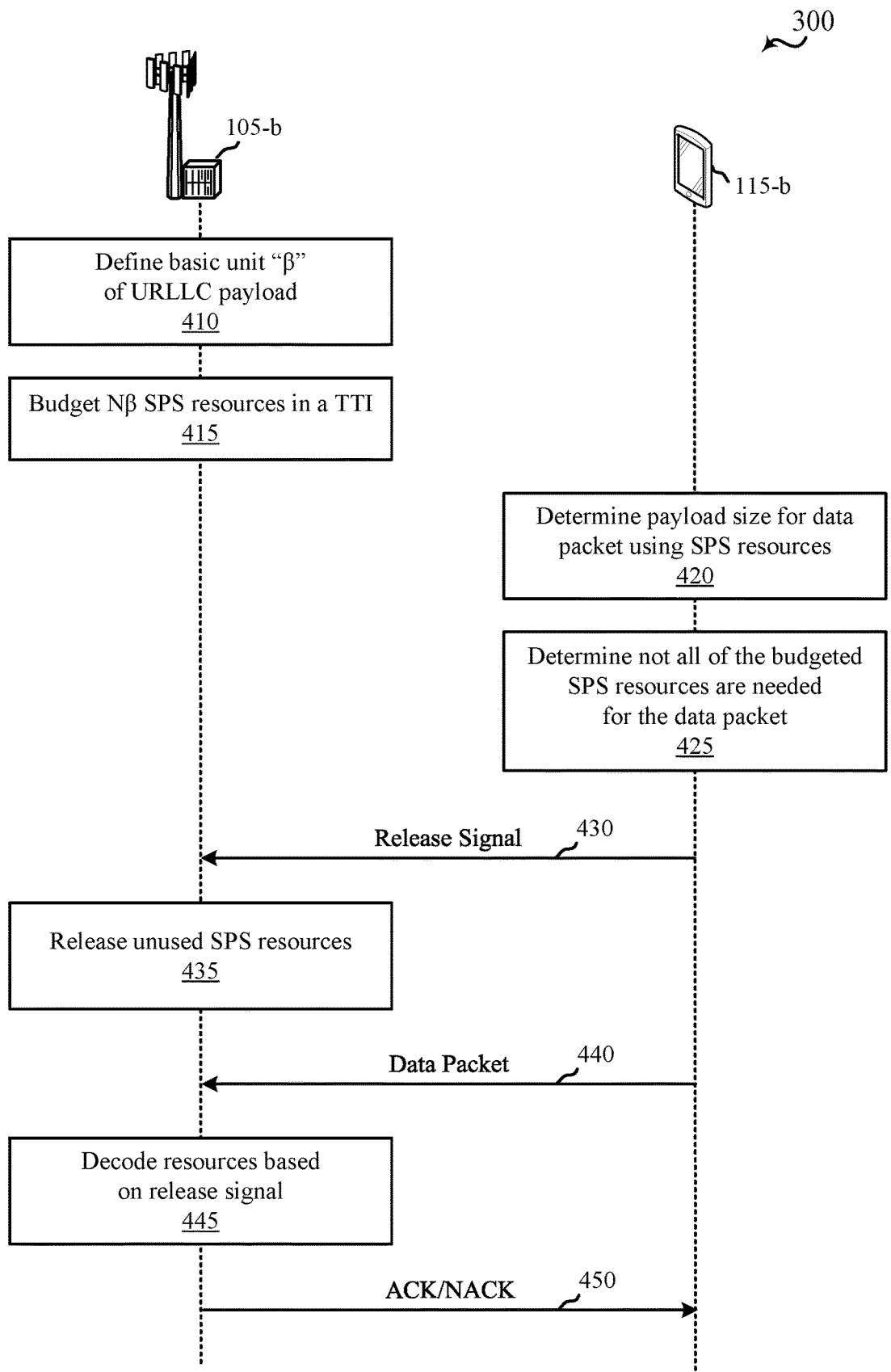

FIG. 4 illustrates an example of communications 400 between a base station 105-b and a UE 115-b that supports TTI-based adaptive URLLC semi-persistent scheduling in accordance with aspects of the present disclosure. Base station 105-b may be an example of aspects of base stations 105 as described with reference to FIGS. 1 and 3. UE 115-b may be an example of aspects of UEs 115 as described with reference to FIGS. 1 and 3. In the example of FIG. 4, UE 115-b sends a release signal to base station 105-b.

As in FIG. 3, at 410, base station 105-b may define a basic unit "β" of URLLC payload. At 415, base station 105-b may coordinate with UE 115-b to establish a block of SPS resources in multiple TTIs. Base station 105-b may communicate the basic unit "β" of URLLC payload to UE 115-b. In some examples, these steps are performed at a previous time, such as during an initiation of communications between base station 105-b and UE 115-b.

At 420, UE 115-b determines a payload size for a data packet that is for priority transmission over SPS resources. If the payload size is less than the allocated Nβ units of resources, UE 115-b may release the unused SRS resources. UE 115-b may send release signal 430 to base station 105-b to release the unused resources. UE 115-b may send release signal 430 in a PDCCH in the TTI.

At 435, base station 105-b may release the unused SPS resources. For example, upon receiving the release signal 430, base station 105-b may assign (N−k)β resources to eMBB UEs with power backoff. At 440, UE 115-b may transmit the data packet 340 to base station 105-b. Base station 105-b may decode only those resources identified as not being released based on release signal 430 at 445. For example, base station 105-b may only decode kβ resources. In some examples, if base station 105-b did not receive the release signal 430, base station 105-b decodes all of the SPS resources.

Base station 105-b sends an ACK/NACK 450 in response to decoding the resources. The ACK/NACK 450 may have variations as discussed with respect to FIG. 3. Some examples may rearrange the order of some of the steps described here. For example, data packet 440 may be transmitted before the unused SPS resources are released. In other examples, other steps may be included. For example, base station 105-b may send another ACK/NACK to UE 115-b in response to release signal 430. In some examples, UE 115-b may only release the SPS resources when base station 105-b has confirmed receipt of the release signal 430 via an ACK.

Figure 5:
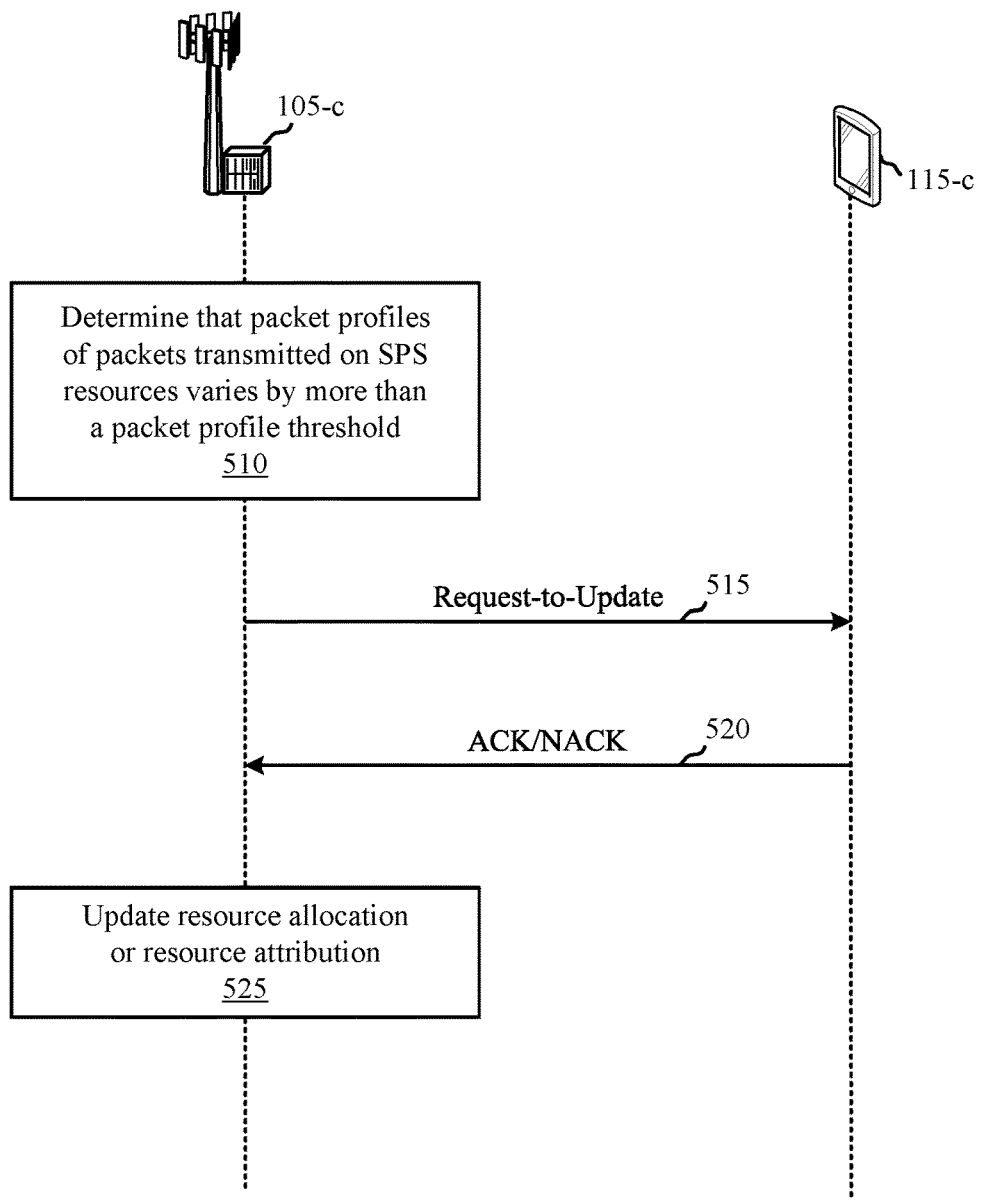
FIGS. 5 through 6 illustrate examples of communications between a base station and a UE that supports semi-static adaptive URLLC semi-persistent scheduling in accordance with aspects of the present disclosure.

FIG. 5 illustrates an example of communications 500 between a base station 105-c and a UE 115-c that supports semi-static adaptive URLLC semi-persistent scheduling in accordance with aspects of the present disclosure. Base station 105-c may be an example of aspects of base stations 105 as described with reference to FIGS. 1, 3, and 4. UE 115-*c* may be an example of aspects of UEs 115 as described with reference to FIGS. 1, 3, and 4. In the example of FIG. 5, base station 105-*c* sends a RTU to UE 115-*c*.

In this example, URLLC packet profiles (e.g., size, deadline requirement, etc.) vary only in a slow time scale. If recent URLLC packets are different (e.g., smaller or larger) than the previously designated SPS resource allocation, the SPS resource allocation may be updated to better match the profiles of the URLLC packets.

At 510, base station 105-*c* determines that a packet profile of one or more packets transmitted on SPS resources varies by more than a packet profile threshold. The packet profile threshold may be a number of SPS resources, a difference in MCS, or any other threshold for a resource attribute. If the packet profile does exceed the packet profile threshold, base station 105-*c* may send an RTU signal 515 to UE 115-*c* to adapt link and scheduling resources. The RTU signal 515 may be transmitted via PDCCH, for example.

At 520, UE 115-*c* sends an ACK/NACK 520 to base station 105-*c*. At 525, base station 105-*c* may update the resource allocation or a resource attribute. In some examples, base station 105-*c* only updates the resource allocation or attributes after receiving ACK 520 from UE 115-*c*. In some examples, base station 105-*c* does not adapt any attributes (e.g., resources, MCS, etc.) if it does not receive ACK 520. Base station 105-*c* may repeat sending RTU 515 until it receives positive confirmation from UE 115-*c*.

Figure 6:
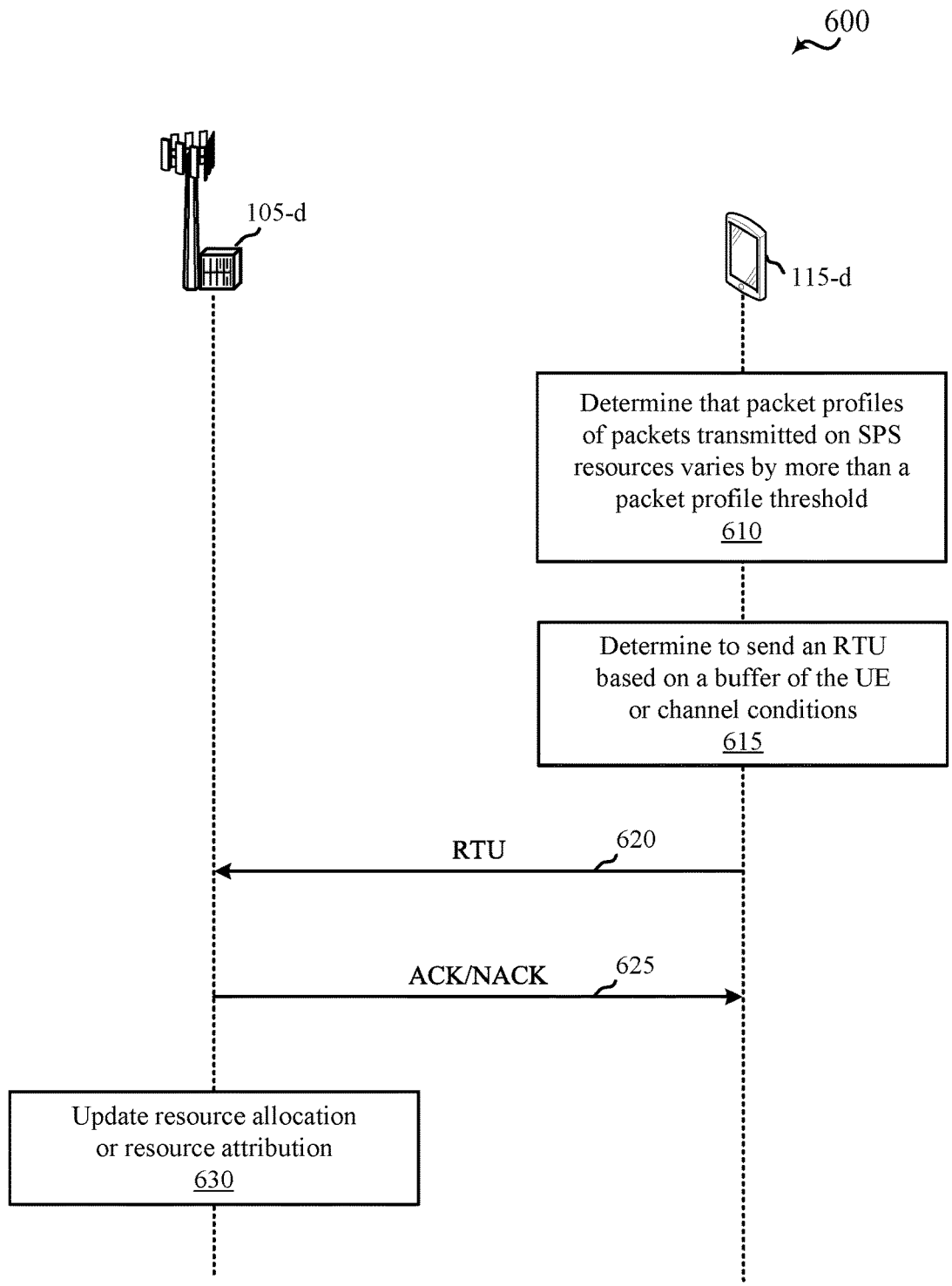

FIG. 6 illustrates an example of communications 600 between a base station 105-*d* and a UE 115-*d* that supports semi-static adaptive URLLC semi-persistent scheduling in accordance with aspects of the present disclosure. Base station 105-*d* may be an example of aspects of base stations 105 as described with reference to FIGS. 1 and 3-5. UE 115-*d* may be an example of aspects of UEs 115 as described with reference to FIGS. 1 and 3-5. In the example of FIG. 6, UE 115-*d* sends an RTU signal to base station 105-*d*.

In this example, URLLC packet profiles (e.g., size, deadline requirement, etc.) vary only in a slow time scale. If recent URLLC packets are different (e.g., smaller or larger) than the previously designated SPS resource allocation, the SPS resource allocation may be updated to better match the profiles of the URLLC packets.

At 610, UE 115-*d* determines that a packet profile of one or more packets transmitted on SPS resources varies by more than a packet profile threshold. The packet profile threshold may be a number of SPS resources, a difference in MCS, or any other threshold for a resource attribute. In another example, and illustrated in step 615, the UE 115-*d* may determine whether to send an RTU based on a buffer of the UE 115-*d* channel conditions.

If the packet profile does exceed the packet profile threshold and/or conditions at the UE 115-*d* warrant, UE 115-*d* may send a request-to-update (RTU) signal 620 to base station 105-*d* to adapt link and scheduling resources. The RTU signal 620 may be transmitted via PDCCH, for example. In some examples, the RTU signal 620 is encrypted such that the RTU signal 620 is only decoded if the entire encrypted RTU signal 620 is received At 625, base station 105-*d* sends an ACK/NACK 625 to UE 115-*d*. At 525, UE 115-*d* may update the resource allocation or a resource attribute. In some examples, base station 105-*c* does not adapt any attributes (e.g., resources, MCS, etc.) unless it receives RTU 620. UE 115-*d* may repeat sending RTU 620 until it receives positive confirmation from base station 105-*d*.

In some examples, conditions may be set so that RTU signals 620 are not sent too frequently. For example, a UE-specific timer may be set, such that an RTU signal 620 may only be sent after expiration of the timer. Alternatively, RTU signals 620 may be sent with a fixed periodicity. Multiple resource/MCS can be used for an UE between RTUs. In some examples, blind decoding applies to decode over these resources or MCS.

Figure 7:
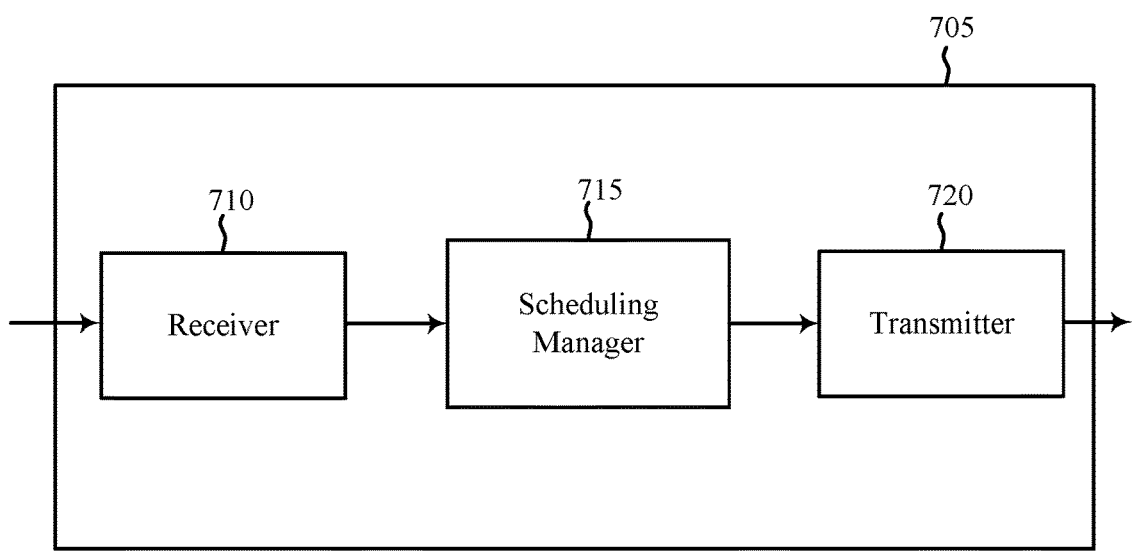
FIGS. 7 through 9 show block diagrams of a device that supports adaptive URLLC semi-persistent scheduling in accordance with aspects of the present disclosure.

FIG. 7 shows a block diagram 700 of a wireless device 705 that supports adaptive URLLC semi-persistent scheduling in accordance with various aspects of the present disclosure. Wireless device 705 may be an example of aspects of a UE 115 or base station 105 as described with reference to FIG. 1. Wireless device 705 may include receiver 710, scheduling manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to adaptive URLLC semi-persistent scheduling, etc.). Information may be passed on to other components of the device. The receiver 710 may be an example of aspects of the transceiver 1035 described with reference to FIG. 10. Receiver 710 may receive the data packet during the TTI using unreleased SPS resources and receive a confirmation of receipt of the RTU signal.

Scheduling manager 715 may be an example of aspects of the scheduling manager 1015 described with reference to FIG. 10 or the scheduling manager 150 of FIG. 1. Scheduling manager 715 and/or at least some of its various sub-components may be implemented in hardware, software executed by a processor, firmware, or any combination thereof. If implemented in software executed by a processor, the functions of the scheduling manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The scheduling manager 715 and/or at least some of its various sub-components may be physically located at various positions, including being distributed such that portions of functions are implemented at different physical locations by one or more physical devices. In some examples, scheduling manager 715 and/or at least some of its various sub-components may be a separate and distinct component in accordance with various aspects of the present disclosure. In other examples, scheduling manager 715 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Scheduling manager 715 may determine a data packet payload size for a transmission using SPS resources budgeted for the transmission of the data packet in a TTI and send a release signal to release a portion of the SPS resources in the TTI based on the data packet payload size. The scheduling manager 715 may also receive a release signal to release a portion of SPS resources in a TTI based on a data packet payload size. The scheduling manager 715 may also identify that a packet profile of packets transmitted on SPS resources varies by more than a packet profile threshold, send, based on the identifying, a RTU signal to update the SPS resources, and update at least one of a resource allocation or a resource attribute based on the packet profile and receipt of the confirmation.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas. Transmitter 720 may transmit the data packet during the TTI using unreleased SPS resources and transmit the release signal until new data for transmission is detected, where the release signal includes a single bit. In some cases, transmitting the data packet using unreleased SPS resources includes: transmitting the data packet in a first portion of the SPS resources, the first portion of the SPS resources being the unreleased SPS resources and being in advance of released SPS resources.

Figure 8:
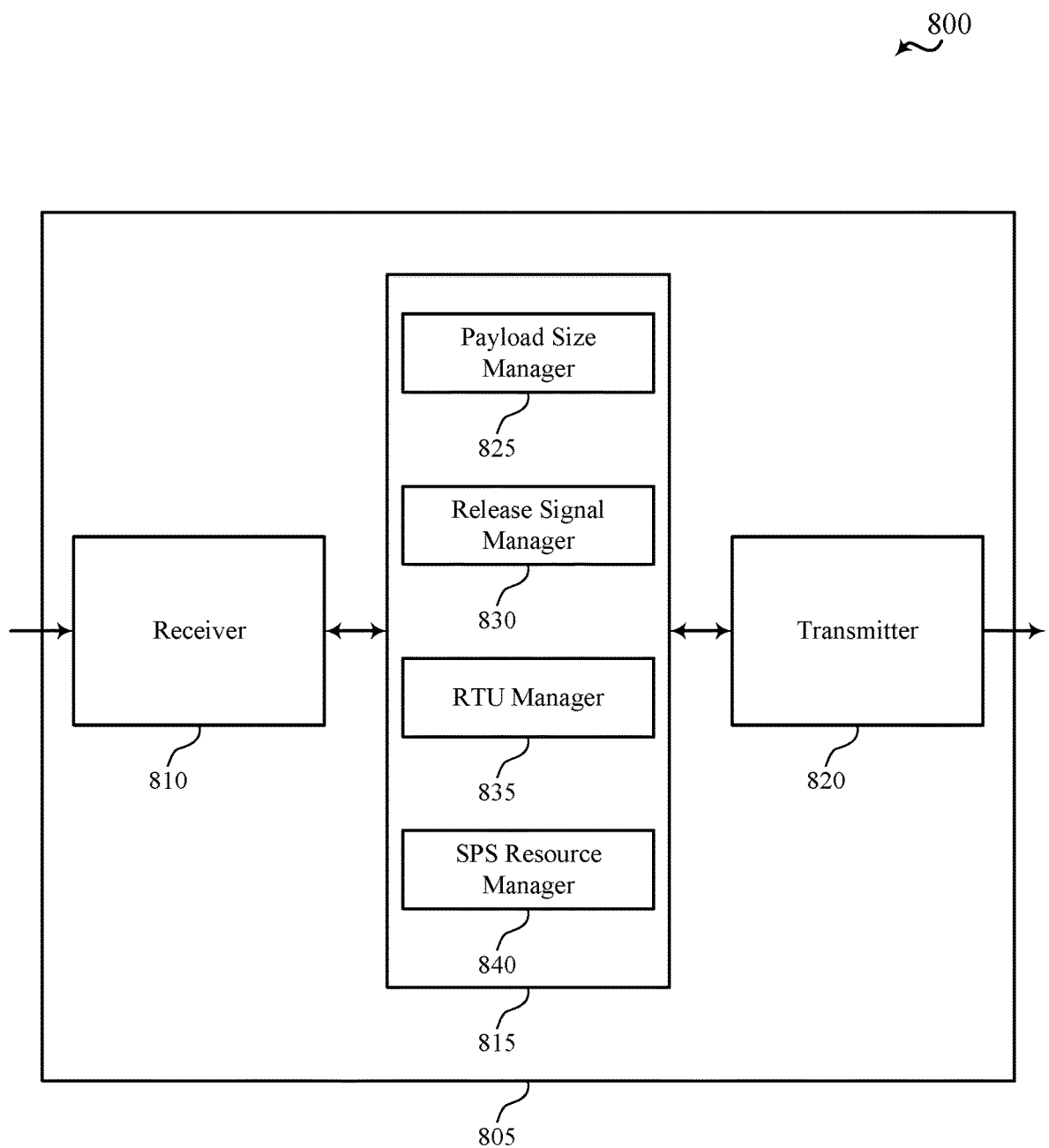

FIG. 8 shows a block diagram 800 of a wireless device 805 that supports adaptive URLLC semi-persistent scheduling in accordance with various aspects of the present disclosure. Wireless device 805 may be an example of aspects of a wireless device 705 or a UE 115 or base station 105 as described with reference to FIGS. 1 and 7. Wireless device 805 may include receiver 810, scheduling manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to adaptive URLLC semi-persistent scheduling, etc.). Information may be passed on to other components of the device. The receiver 810 may be an example of aspects of the transceiver 1035 described with reference to FIG. 10.

Scheduling manager 815 may be an example of aspects of the scheduling manager 1015 described with reference to FIG. 10. Scheduling manager 815 may also include payload size manager 825, release signal manager 830, RTU manager 835, and SPS resource manager 840.

Payload size manager 825 may determine a data packet payload size for a transmission using SPS resources budgeted for the transmission of the data packet in a TTI and identify that a packet profile of packets transmitted on SPS resources varies by more than a packet profile threshold. In some cases, determining the data packet payload size further includes: determining a number of basic payload units to be used for the transmission of the data packet. In some cases, the SPS resources are reserved for priority traffic. In some cases, the packet profile varies in time by less than a time threshold.

Release signal manager 830 may send a release signal to release a portion of the SPS resources in the TTI based on the data packet payload size and receive a release signal to release a portion of SPS resources in a TTI based on a data packet payload size. In some cases, the release signal to release the portion of the SPS resources is further based on an amount of budgeted units that are available less the number of units.

RTU manager 835 may send, based on the identifying, a request-to-update (RTU) signal to update the SPS resources, periodically resend the RTU signal until the confirmation of the RTU signal is received, and determine to send the RTU signal based on at least one of a buffer status of the UE and a channel condition.

SPS resource manager 840 may update at least one of a resource allocation or a resource attribute based on the packet profile and receipt of the confirmation. In some cases, the resource attribute further includes at least one of a modulation and coding scheme (MCS) and a scheduling grant.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
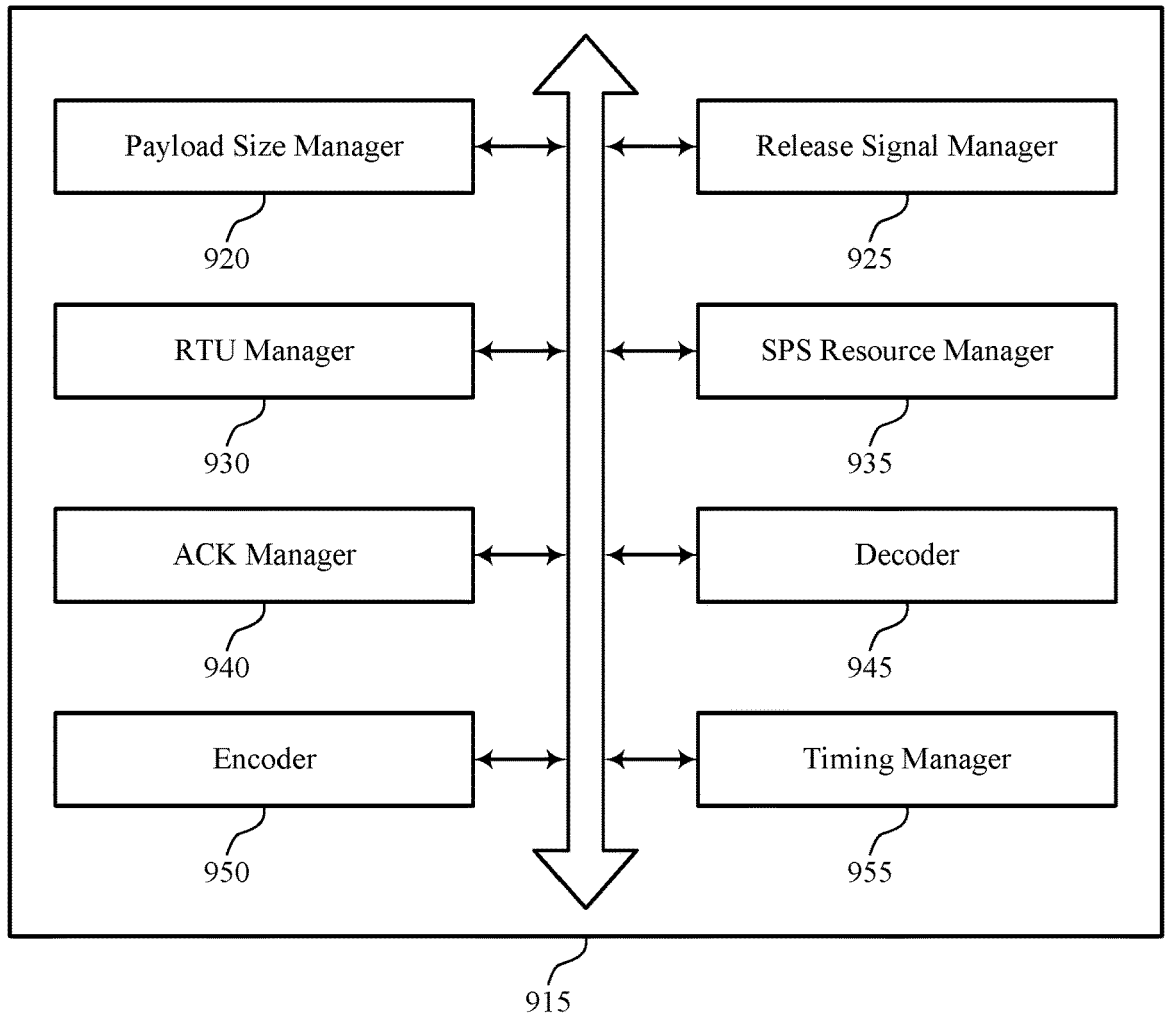

FIG. 9 shows a block diagram 900 of a scheduling manager 915 that supports adaptive URLLC semi-persistent scheduling in accordance with various aspects of the present disclosure. The scheduling manager 915 may be an example of aspects of a scheduling manager 715, a scheduling manager 815, or a scheduling manager 1015 described with reference to FIGS. 7, 8, and 10. The scheduling manager 915 may include payload size manager 920, release signal manager 925, RTU manager 930, SPS resource manager 935, ACK manager 940, decoder 945, encoder 950, and timing manager 955. Each of these modules may communicate, directly or indirectly, with one another (e.g., via one or more buses).

Payload size manager 920 may determine a data packet payload size for a transmission using SPS resources budgeted for the transmission of the data packet in a TTI and identify that a packet profile of packets transmitted on SPS resources varies by more than a packet profile threshold. In some cases, determining the data packet payload size further includes: determining a number of basic payload units to be used for the transmission of the data packet. In some cases, the SPS resources are reserved for priority traffic. In some cases, the packet profile varies in time by less than a time threshold.

Release signal manager 925 may send a release signal to release a portion of the SPS resources in the TTI based on the data packet payload size and receive a release signal to release a portion of SPS resources in a TTI based on a data packet payload size. In some cases, the release signal to release the portion of the SPS resources is further based on an amount of budgeted units that are available less the number of units.

RTU manager 930 may send, based on the identifying, a request-to-update (RTU) signal to update the SPS resources, periodically resend the RTU signal until the confirmation of the RTU signal is received, and determine to send the RTU signal based on at least one of a buffer status of the UE and a channel condition.

SPS resource manager 935 may update at least one of a resource allocation or a resource attribute based on the packet profile and receipt of the confirmation. In some cases, the resource attribute further includes at least one of a modulation and coding scheme (MCS) and a scheduling grant.

ACK manager 940 may receive one or more ACKs in response to the transmission, the one or more ACKs corresponding to each of a basic payload unit included in the transmission, receive one or more additional ACKs corresponding to the released SPS resources, ignore the one or more additional ACKs, receive a single ACK in response to the transmission of the data packet, send a single ACK in response to receiving the data packet during the TTI, and send a same number of acknowledgements (ACK) and negative-acknowledgements (negative acknowledgement (NACK)) as there are SPS resources in the TTI in response to receiving the data packet during the TTI.

Decoder 945 may decode only the unreleased resources in the TTI based on the release signal and decode all of the SPS resources in the TTI. Encoder 950 may encode the RTU signal such that the RTU signal is only decoded if the entire encrypted RTU signal is received. Timing manager 955 may define a timer, where sending the RTU signal is based on an expiration of the timer.

Figure 10:
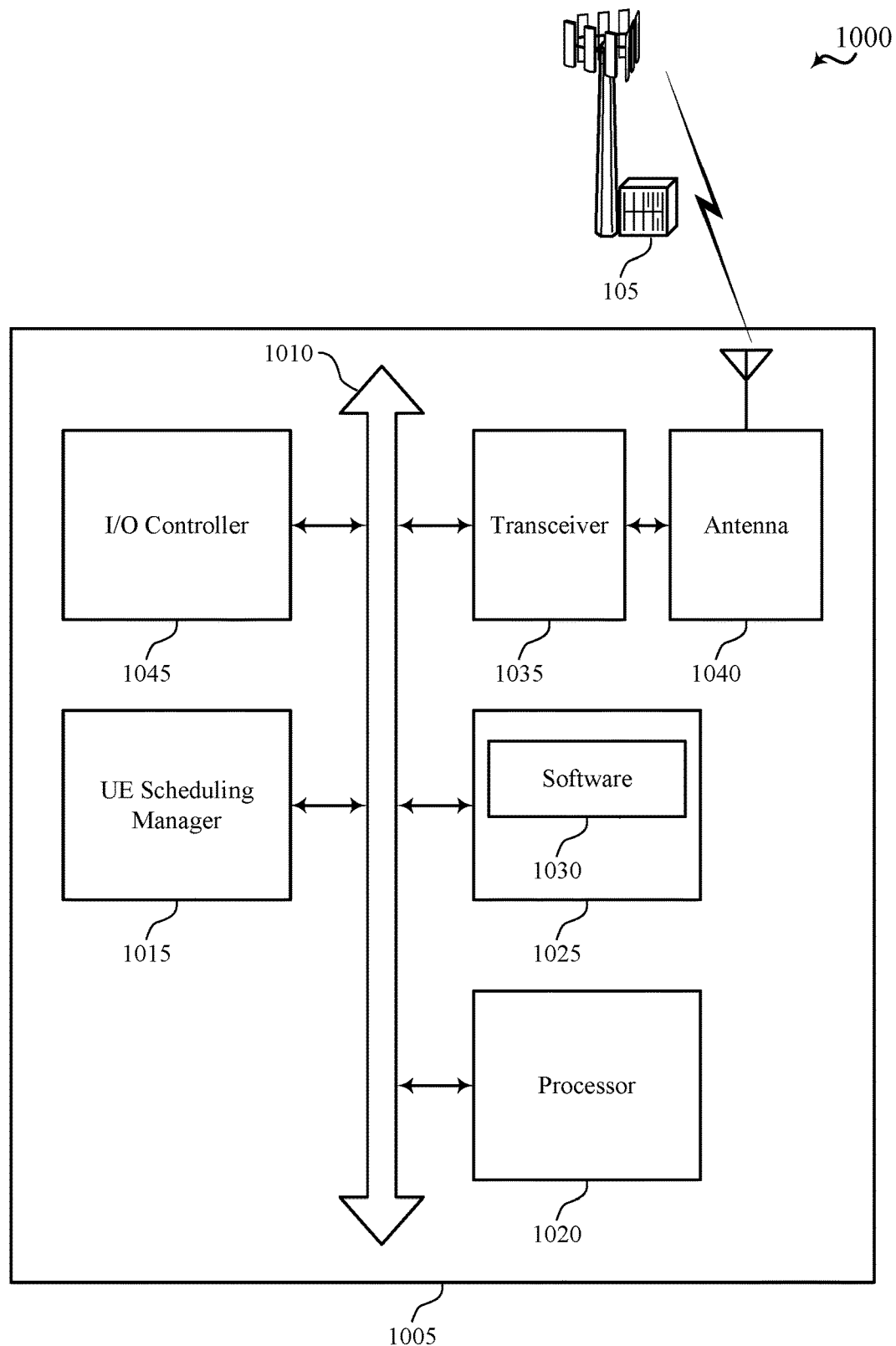
FIG. 10 illustrates a block diagram of a system including a UE that supports adaptive URLLC semi-persistent scheduling in accordance with aspects of the present disclosure.

FIG. 10 shows a diagram of a system 1000 including a device 1005 that supports adaptive URLLC semi-persistent scheduling in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE scheduling manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting adaptive URLLC semi-persistent scheduling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support adaptive URLLC semi-persistent scheduling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
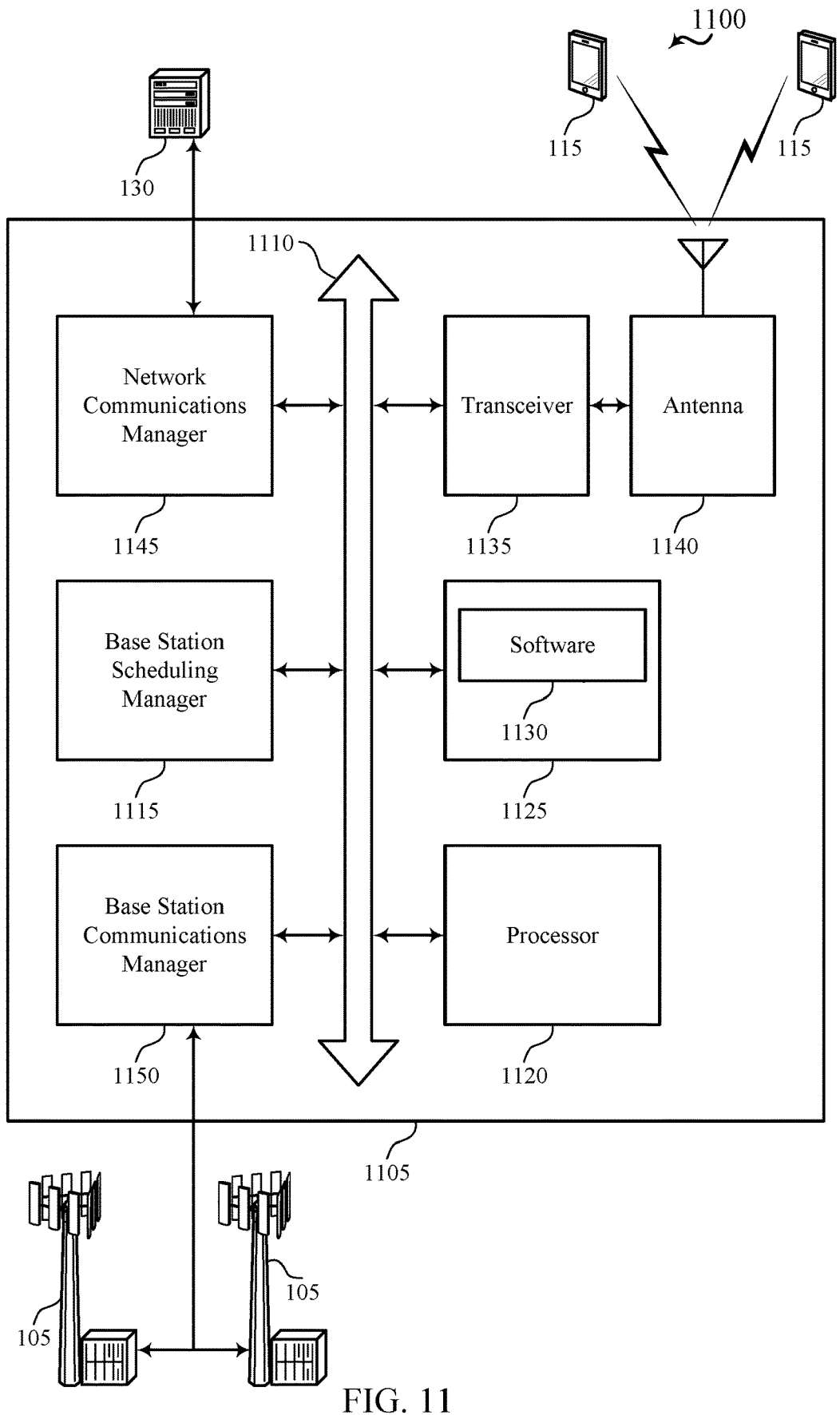
FIG. 11 illustrates a block diagram of a system including a base station that supports adaptive URLLC semi-persistent scheduling in accordance with aspects of the present disclosure.

FIG. 11 shows a diagram of a system 1100 including a device 1105 that supports adaptive URLLC semi-persistent scheduling in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station scheduling manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115. The base station scheduling manager 1115 may be an example of the scheduling manager 140 of FIG. 1.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting adaptive URLLC semi-persistent scheduling).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support adaptive URLLC semi-persistent scheduling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an Long Term Evolution (LTE)/LTE-A wireless communication network technology to provide communication between base stations 105.

Figure 12:
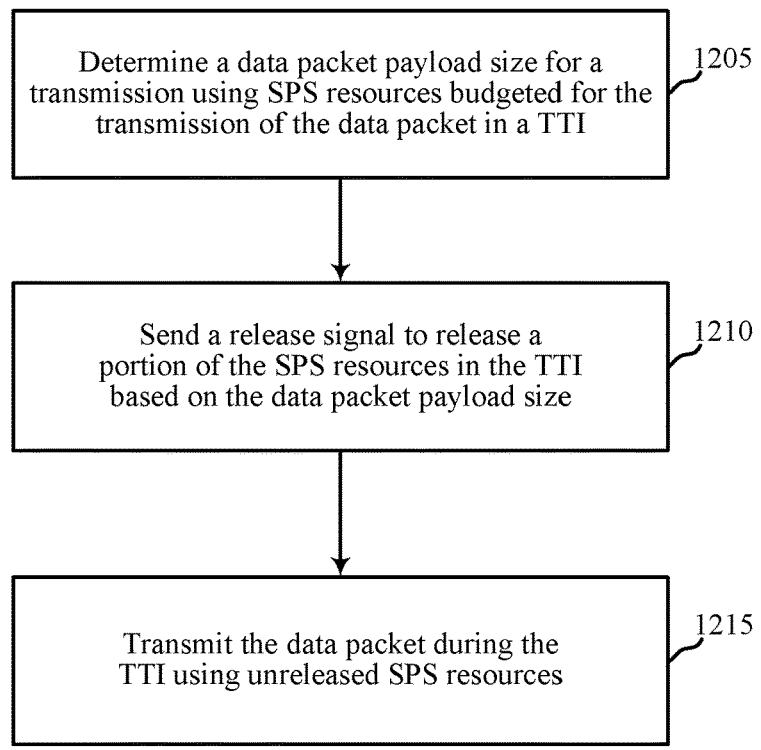
FIGS. 12 through 14 illustrate methods for adaptive URLLC semi-persistent scheduling in accordance with aspects of the present disclosure.

FIG. 12 shows a flowchart illustrating a method 1200 for adaptive URLLC semi-persistent scheduling in accordance with various aspects of the present disclosure. The operations of method 1200 may be implemented by a UE 115 or base station 105 or its components as described herein. For example, the operations of method 1200 may be performed by a scheduling manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may determine a data packet payload size for a transmission using SPS resources budgeted for the transmission of the data packet in a transmission time interval (TTI). The operations of block 1205 may be performed according to the methods described with reference to FIGS. 1 through 6. In certain examples, aspects of the operations of block 1205 may be performed by a payload size manager as described with reference to FIGS. 7 through 9.

At block 1210 the UE 115 or base station 105 may send a release signal to release a portion of the SPS resources in the TTI based on the data packet payload size. The operations of block 1210 may be performed according to the methods described with reference to FIGS. 1 through 6. In certain examples, aspects of the operations of block 1210 may be performed by a release signal manager as described with reference to FIGS. 7 through 9.

At block 1215 the UE 115 or base station 105 may transmit the data packet during the TTI using unreleased SPS resources. The operations of block 1215 may be performed according to the methods described with reference to FIGS. 1 through 6. In certain examples, aspects of the operations of block 1215 may be performed by a transmitter as described with reference to FIGS. 7 through 9.

Figure 13:
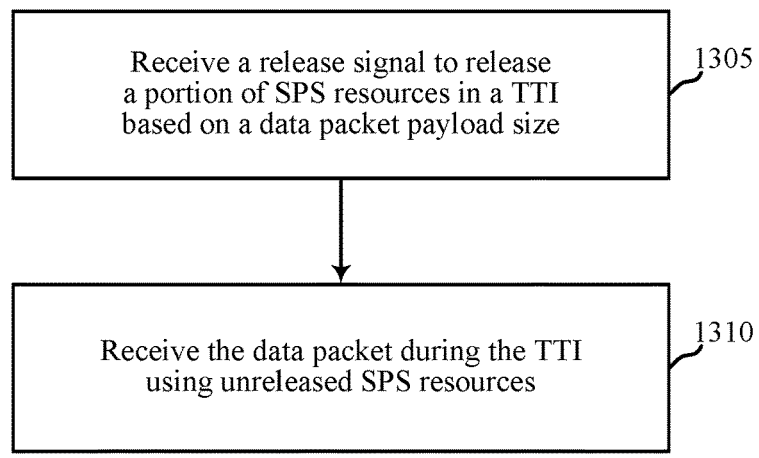

FIG. 13 shows a flowchart illustrating a method 1300 for adaptive URLLC semi-persistent scheduling in accordance with various aspects of the present disclosure. The operations of method 1300 may be implemented by a UE 115 or base station 105 or its components as described herein. For example, the operations of method 1300 may be performed by a scheduling manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a release signal to release a portion of SPS resources in a transmission time interval (TTI) based on a data packet payload size. The operations of block 1305 may be performed according to the methods described with reference to FIGS. 1 through 6. In certain examples, aspects of the operations of block 1305 may be performed by a release signal manager as described with reference to FIGS. 7 through 9.

At block 1310 the UE 115 or base station 105 may receive the data packet during the TTI using unreleased SPS resources. The operations of block 1310 may be performed according to the methods described with reference to FIGS. 1 through 6. In certain examples, aspects of the operations of block 1310 may be performed by a receiver as described with reference to FIGS. 7 through 9.

Figure 14:
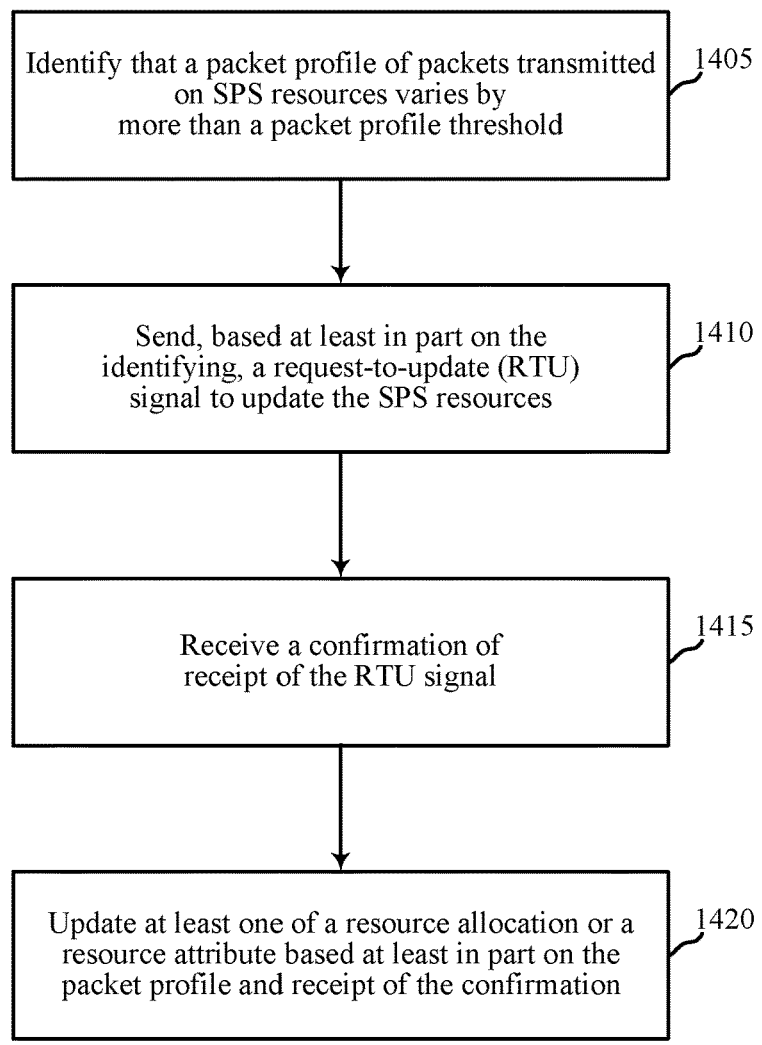

FIG. 14 shows a flowchart illustrating a method 1400 for adaptive URLLC semi-persistent scheduling in accordance with various aspects of the present disclosure. The operations of method 1400 may be implemented by a UE 115 or base station 105 or its components as described herein. For example, the operations of method 1400 may be performed by a scheduling manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify that a packet profile of packets transmitted on SPS resources varies by more than a packet profile threshold. The operations of block 1405 may be performed according to the methods described with reference to FIGS. 1 through 6. In certain examples, aspects of the operations of block 1405 may be performed by a payload size manager as described with reference to FIGS. 7 through 9.

At block 1410 the UE 115 or base station 105 may send, based at least in part on the identifying, a request-to-update (RTU) signal to update the SPS resources. The operations of block 1410 may be performed according to the methods described with reference to FIGS. 1 through 6. In certain examples, aspects of the operations of block 1410 may be performed by a RTU manager as described with reference to FIGS. 7 through 9.

At block 1415 the UE 115 or base station 105 may receive a confirmation of receipt of the RTU signal. The operations of block 1415 may be performed according to the methods described with reference to FIGS. 1 through 6. In certain examples, aspects of the operations of block 1415 may be performed by a receiver as described with reference to FIGS. 7 through 9.

At block 1420 the UE 115 or base station 105 may update at least one of a resource allocation or a resource attribute based at least in part on the packet profile and receipt of the confirmation. The operations of block 1420 may be performed according to the methods described with reference to FIGS. 1 through 6. In certain examples, aspects of the operations of block 1420 may be performed by a SPS resource manager as described with reference to FIGS. 7 through 9.

It should be noted that the methods described above describe possible implementations, and that the operations and the steps may be rearranged or otherwise modified and that other implementations are possible. Furthermore, aspects from two or more of the methods may be combined. That is, all of the methods described may be combined into a complete adaptive functionality.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless node, comprising:
   determining, by the wireless node, a data packet payload size for a data packet associated with a traffic transmission using semi-persistent scheduling (SPS) resources budgeted for the transmission of traffic of a first type in a data channel of a transmission time interval (TTI), wherein the SPS resources are reserved for the transmission of traffic of the first type and comprise only one SPS occasion;
   sending, by the wireless node prior to transmission of the data packet on SPS resources, a release signal in a control channel to release a portion of the SPS resources in the TTI based at least in part on the data packet payload size and that there is no additional traffic of the first type for transmission in the SPS resources; and
   transmitting, by the wireless node, the data packet in the data channel during the TTI using unreleased SPS resources.

2. The method of claim 1, wherein transmitting the data packet using unreleased SPS resources comprises:
   transmitting the data packet in a first portion of the SPS resources, the first portion of the SPS resources being the unreleased SPS resources and being in advance of released SPS resources.

3. The method of claim 1, further comprising:
   receiving one or more acknowledgements (ACKs) in response to the transmission of traffic of the first type, the one or more ACKs corresponding to each of a basic payload unit included in the transmission.

4. The method of claim 3, further comprising:
   receiving one or more additional ACKs corresponding to released SPS resources; and
   ignoring the one or more additional ACKs.

5. The method of claim 1, further comprising:
   receiving a single acknowledgement (ACKs) in response to the transmission of the data packet.

6. The method of claim 1, wherein the portion of the SPS resources are released for other types of traffic.

7. The method of claim 1, wherein determining the data packet payload size further comprises determining that no data is to be sent in the SPS resources of the TTI, the method further comprising:
transmitting the release signal until new data for transmission is detected, wherein the release signal comprises a single bit.

8. A method for wireless communication at a wireless node, comprising:
receiving, by the wireless node, a release signal to release a portion of semi-persistent scheduling (SPS) resources in a control channel of a transmission time interval (TTI) based at least in part on a data packet payload size of a data packet associated with a transmission of traffic of the first type and that there is no additional traffic of the first type for transmission in the SPS resources, the release signal being received prior to receipt of the data packet on SPS resources, wherein the SPS resources comprise only one SPS occasion; and
receiving, by the wireless node, the data packet in the data channel during the TTI using unreleased SPS resources.

9. The method of claim 8, further comprising:
decoding only the unreleased SPS resources in the TTI based on the release signal.

10. The method of claim 8, further comprising:
sending a single acknowledgement (ACK) in response to receiving the data packet during the TTI.

11. The method of claim 8, further comprising:
decoding all of the SPS resources in the TTI; and
sending a same number of acknowledgements (ACK) and negative-acknowledgements (NACK) as there are SPS resources in the TTI in response to receiving the data packet during the TTI.

12. An apparatus for wireless communication, comprising:
a processor;
memory in electronic communication with the processor; and
instructions stored in the memory, the instructions being executable by the processor to:
determine a data packet payload size for a data packet associated with a traffic transmission using semi-persistent scheduling (SPS) resources budgeted for the transmission of traffic of a first type in a data channel of a transmission time interval (TTI), wherein the SPS resources are reserved for the transmission of traffic of the first type and comprise only one SPS occasion;
send a release signal, prior to transmission of the data packet on SPS resources, in a control channel to release a portion of the SPS resources in the TTI based at least in part on the data packet payload size and that there is no additional traffic of the first type for transmission in the SPS resources; and
transmit the data packet in the data channel during the TTI using unreleased SPS resources,
the apparatus being one of a base station or a user equipment.

13. The apparatus of claim 12, wherein the portion of the SPS resources is a first portion of the SPS resources, and wherein the instructions executable by the processor to transmit the data packet using unreleased SPS resources are executable by the processor to:
transmit the data packet in a second portion of the SPS resources, the second portion of the SPS resources being the unreleased SPS resources and being in advance of released first portion of the SPS resources.

14. The apparatus of claim 12, wherein the instructions are further executable by the processor to:
receive one or more acknowledgements (ACKs) in response to the transmission of traffic of the first type, the one or more ACKs corresponding to each of a basic payload unit included in the transmission.

15. The apparatus of claim 14, wherein the instructions are further executable by the processor to:
receive one or more additional ACKs corresponding to released SPS resources; and
ignore the one or more additional ACKs.

16. The apparatus of claim 12, wherein the instructions are further executable by the processor to:
receive a single acknowledgement (ACKs) in response to the transmission of traffic of the data packet.

17. The apparatus of claim 12, wherein the portion of the SPS resources are released for other types of traffic.

18. The apparatus of claim 12, wherein the instructions executable by the processor to determine the payload size are further executable by the processor to:
determine that no data is to be sent in the SPS resources of the TTI; and
transmit the release signal until new data for transmission is detected, wherein the release signal comprises a single bit.

19. The method of claim 1, wherein determining the data packet payload size further comprises:
determining a number of basic payload units to be used for the transmission of the data packet.

20. The method of claim 19, wherein the release signal to release the portion of the SPS resources is further based on an amount of budgeted units that are available less the number of basic payload units.

21. The apparatus of claim 12, wherein the instructions executable by the processor to determine the data packet payload size are executable by the processor to:
determine a number of basic payload units to be used for the transmission of the data packet.

22. The apparatus of claim 21, wherein the release signal to release the portion of the SPS resources is further based on an amount of budgeted units that are available less the number of basic payload units.

* * * * *